UNITED STATES PATENT OFFICE 2,632,954

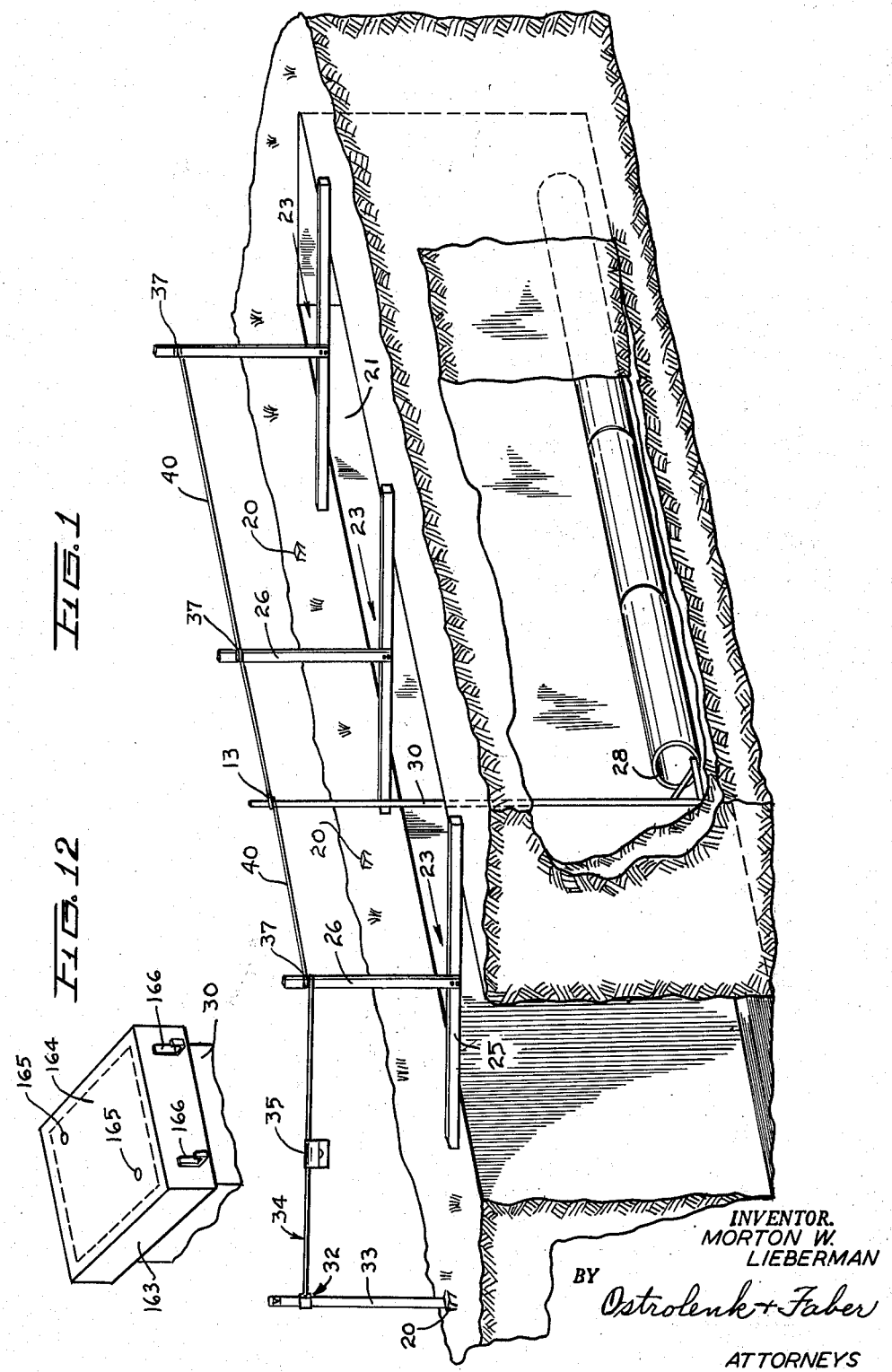

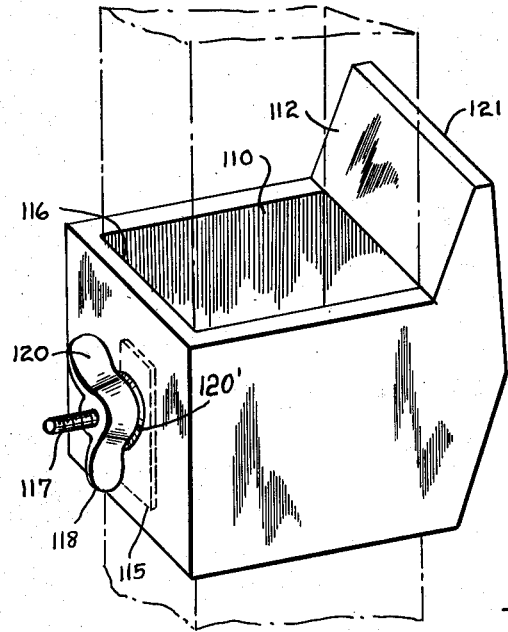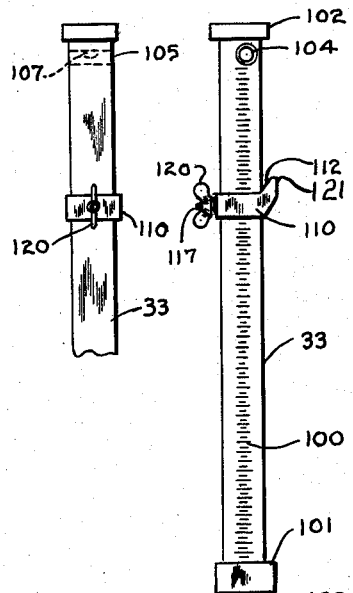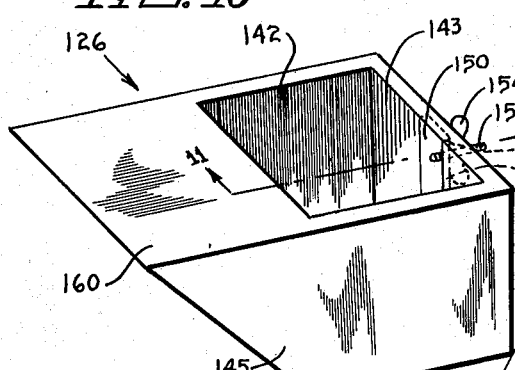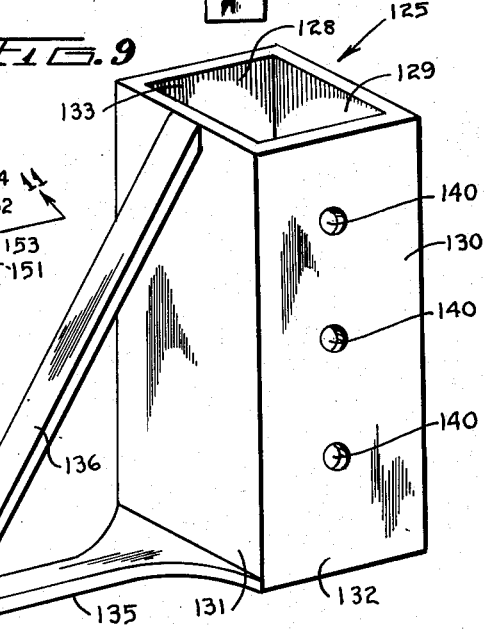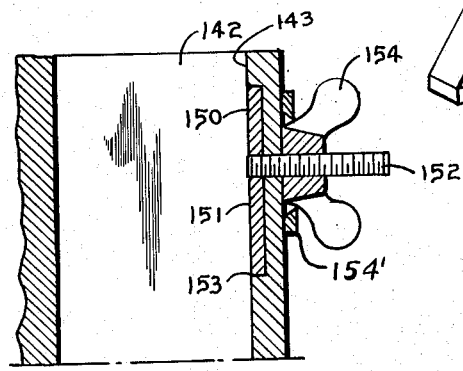

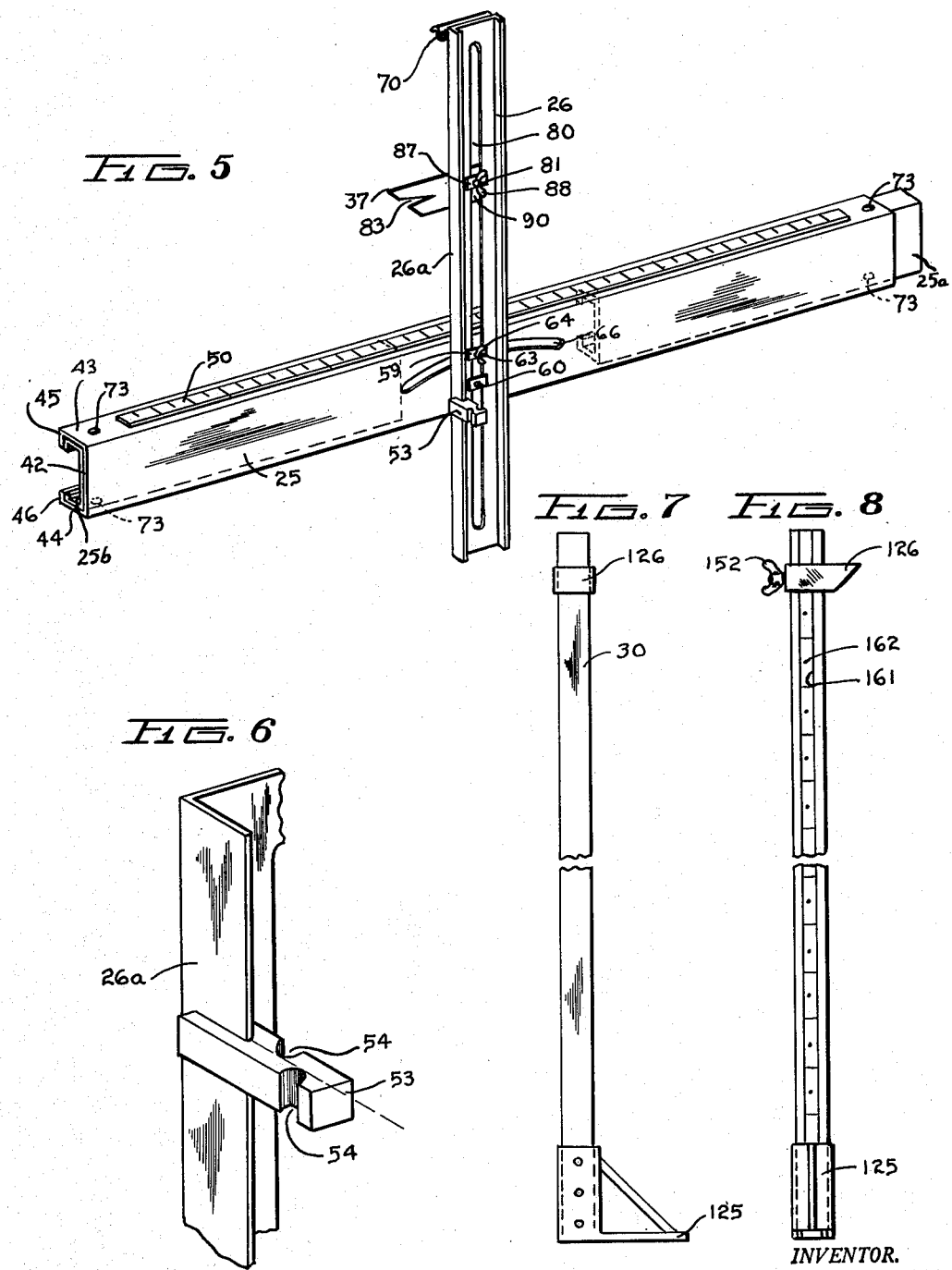

PRECISION GRADE BOARD AND ACCESSORIES

Morton W. Lieberman, Middletown, N. J.

Application February 11, 1947, Serial No. 727,799

1 Claim. (Cl. 33—86)

My present invention relates to grade measuring and measurement transferring methods and devices and more particularly to grade boards and other instruments which assist in the laying of pipes, sewers, conduits, open channels, footings and cable ways, etc. along a predetermined grade line below the level of the principal grade. For this purpose, my invention comprises a novel adjustable grade board, precision grade pole accessories, and a precision grade transfer rod to determine continuously the proper level for the bottom of an excavation in which a pipe or cable is to be laid.

The purpose here is to maintain the bottom of the trench or excavation at the continuously proper grade so that the pipe or cable or other elements which are to be placed in the bottom of the trench will be at the proper grade for correct fluid flow and will not be subject to any undue or unexpected stresses owing to undesired variations in grade.

For this purpose, I lay out a plurality of grade stakes adjacent a line along which the excavation is to run and determine for each grade stake the elevation of that grade stake above the bench mark or other zero point from which the elevations are measured. This zero point or bench mark may be taken from the mean high-water mark of an adjacent body of water or from some other geodetic element or may be an arbitrarily selected bench mark or zero point.

The elevation of the pipe invert above the zero point or bench mark is then selected in accordance with the desired gradient or with the nature of the surrounding terrain and also in accordance with the average depth at which it is desired that the pipe, cable way, or other element embedded in the trench is to run.

The excavation is first dug to approximately the proper level along the proper line and my novel grade boards are set up across the upper ends of the trench opposite the grade stakes. The grade boards are inverted T-shaped members having a head which straddles the trench and a central vertical member.

The depth of the trench or the elevation of the pipe invert for that point is determined, and the difference between the elevation of the pipe invert and the grade stake is then obtained by simple subtraction. The difference in length between the foregoing resulting difference and the length of the grade pole which is used is then marked off on a rule or piece of wood which is mounted on the grade stake; this mark is transferred by spirit level and mason line to the upright of the grade board.

The grade board is thus marked at each position which may be 50 feet apart and mason line is strung between the marks on the successive grade boards. The grade pole, when its upper position touches the mason line, will then be so arranged that its lower end will extend down to the exact depth to which the bottom of the trench is to go.

By way of example, assuming that the pipe line is to run approximately 10 feet deep, the grade pole length normally would be 12 or 13 feet. Grade boards are then set up opposite each grade stake.

If the grade pole length is 13 feet and the pipe invert elevation is 9' 6" and the grade stake elevation 19' 10", then the difference between the latter two would be 10' 4" and the amount to be added for a 13 foot grade pole is 2' 8". The 2' 8" is then marked off on a rule or stick of wood and is placed on top of the grade stake. The 2' 8" is transferred to the grade board as above described.

At the next station, the difference at that point is transferred to the upright of the grade board; and so on from station to station.

The line strung between the marks on the successive grade boards duplicates the grade of the bottom of the trench to be excavated but is exactly 13 feet above this grade. Consequently, using a 13 foot grade pole, the exact depth of the bottom of the trench at any point can be determined by excavating the trench until the grade pole is exactly even with the grade line when the bottom of the grade pole rests on the bottom of the trench or structure being installed.

As construction enters deeper or shallower trench cuts, the grade pole may, of course, be lengthened or shortened to suit conditions.

My invention is primarily directed to the formation of a precision grade board, precision grade transfer rod, and precision grade pole accessories which will facilitate the grading of the bottom of a trench so that the foregoing method may be used with exactness.

Essentially my invention comprises a precision grade board with a pivoted upright member secured to the base and so arranged that it may be rotated with respect to the base to a position where the upright is exactly perpendicular to the earth or an exact extension of a radius of the earth.

My invention contemplates a precision grade transfer rod adapted to be set on a grade stake and provided with its own spirit level, adjustable grade set clamp, and line grip to facilitate the transfer of the proper grade marking to the grade board.

My invention also contemplates simplified grade pole accessories which may be used in connection with a standard wood strip of ordinary cross-section to provide means for setting the grade pole properly at the bottom of the excavation and means for obtaining an adjustable pole set where variations in the pole length are required owing to a large amount of variation in the grade of the surrounding terrain.

Thus, the primary object of my invention is the provision of novel grade determining instruments for maintaining the base of an excavation or trench at the predetermined level throughout the length of the excavation.

Another object of my invention is the provision of a novel adjustable grade board for use in connection with trench excavations.

Another object of my invention is the provision of a novel simplified grade transfer rod for use in connection with the trench excavation.

A further object of my invention is the provision of novel precision grade pole accessories for use in connection with a pole of standard section.

The foregoing and many other objects of my invention will become apparent in the following description and drawings in which:

Figure 1 is a diagrammatic view in perspective illustrating the manner in which my novel grade board, grade transfer rod, and grade pole accessories are used in accordance with my invention.

Figure 2 is a side view of my novel precision grade transfer rod.

Figure 3 is a rear view of my novel precision grade transfer rod.

Figure 4 is a view in perspective of the grade set clamp used in connection with my novel precision grade transfer rod.

Figure 5 is a view in perspective of my novel precision grade board.

Figure 6 is an enlarged view of a portion of my novel precision grade board.

Figure 7 is a side view of a grade pole in connection with which my precision grade pole accessories are used.

Figure 8 is a view of the grade pole of Figure 7 taken at 90° from the view of Figure 7.

Figure 9 is a view in perspective of my novel grade pole shoe which is used in connection with the grade pole shown in Figures 7 and 8.

Figure 10 is a view in perspective of my novel adjustable pole set which is used in connection with the grade pole of Figures 7 and 8.

Figure 11 is a cross-sectional view taken on line 11—11 of Figure 10.

Figure 12 is a view in perspective of my novel grade pole cap.

Referring now to Figure 1, the grade stakes 20, 20 are laid out adjacent the line of the excavation 21 which is to be dug, the said grade stakes being laid out approximately 50 feet apart and the grade of each stake being determined with reference to some zero point or bench mark originally decided upon before the section of trench 21 is dug.

The zero point or bench mark, as above described, is preferably some predetermined point lower than the lowest point which the bottom of the trench will reach, although any zero point or bench mark, even an elevated one, can be used without departing from the principles of my invention.

The trench is at least partially excavated to approximately the desired depth and then the grade boards 23 are laid across the trench as shown, each grade board 23 being placed opposite a grade stake 20.

The grade board consists of a horizontal member 25 which straddles the edges of the trench and a vertical member 26. The elevation of the pipe line invert 28 for that particular point is determined, and this elevation is subtracted from the elevation of the grade stake 20 at that point.

Assuming that the elevation of the pipe line invert at that point is 9'6" and that the grade stake elevation is 19'10", then the difference between these two elevations is 10'4". Where a grade pole 30 which is 13 feet long is to be used, then the difference between the 10'4" thus determined and the length of the grade pole 30 is 2'8".

The 2'8" is marked off at point 32 on the grade transfer rod 33 which is then set on the grade stake 20.

A mason line 34, with line level 35, attached at one end to the point 32 of grade transfer rod 33 is then used to transfer the mark to the point 37 of the upright member 26 of the grade board 23 and the grade line 40 is secured to point 37 of upright 26 of grade board 23.

The height of grade line 40 at this point 37, above the invert of the pipe which is to be laid, is thus exactly 13 feet. The proper point 37 is similarly determined for each of the grade boards 23 and line 40 is strung from point 37 to point 37 successively along the grade boards, thus providing a grade line 40 which is exactly 13 feet above the required level of the pipe or other structure to be installed.

Consequently, the required depth of the excavation can be determined simply by setting the adjustable pole set on grade pole 30 at the 13 foot position, placing the pole on the bottom of the trench and determining to what extent the grade pole rises above the grade line 40. The trench is then excavated until the 13 foot position of the grade pole is even with the grade line 40, allowance being made for the thickness of the pipe or structure and for any special foundation which may be required.

By this means, the excavators have a simplified method for determining when the required depth of the trench has been reached at any point and will not over-dig or under-dig the trench. The pipe or cable way, etc. will thus be laid exactly as desired without any variations which may result in undue stresses on the pipe, cable, or way, etc., or variations in direction which may make relaying of the pipe, at least in part, necessary.

My invention is directed to precision instruments for this purpose which will minimize or obviate any errors which may occur and which will also facilitate the transfer of grade markings and make the work much faster and more accurate.

My novel grade board is shown in Figures 5 and 6. The base 25 of my novel grade board comprises essentially a C-shaped channel member having the vertical element 42, the upper and lower horizontal flanges 43 and 44, respectively, and the reentrant flanges 45 and 46, respectively. Additional sliding extensions 25a and 25b may be included to bridge wide trenches.

A sliding centering rule 50 may be mounted on flange 43 of the base 25, being movable laterally in any suitable manner. It may, if desired, be held by tight transverse frictional straps on flange 43. Rule 50 may, of course, be mounted on any surface of base 25.

If desired, however, a pin or hook 53 having tape holding notches 54 may be provided on the alignment flange 26a of the board for the attachment of a measuring tape which may be used for centering the grade board from the grade stake.

The rule 50 or member 53 may be used to make certain that the upright element 26 of the grade board is exactly over the center line of the proposed structure. The upright element 26 of the grade board is pivotally mounted on the bolt 60 which is secured to the vertical element 42 of the grade board base 25.

The lower end of the vertical element 26 also carries the bolt 63 threaded into an appropriate opening in strap 59 therein, the said bolt 63 being provided with the winged nut 64.

The head of bolt 63 projects on the opposite side of curved slot 66 of the vertical section 42 of the base 25 of the grade board so that the bolt 63 may move along the slot 66.

Consequently, the upright 26 of the grade board may be rotated about the pivot 60 and when it is rotated to the correct position may be locked in that position by rotating the nut 64 to pull the head of the bolt 63 up against the material of the member 42 defining the slot 66 to lock the upright element 26 in place.

This is necessary where the opposite sides of the trench may not be exactly level but where, however, it is essential that the upright element 26 of the grade board be perfectly vertical. The upright 26 of the grade board may thus be easily rotated about the pivot 60 until it is perfectly vertical, and then it may be locked in place.

In order to ascertain that the upright 26 is perfectly vertical, a clamp 70 is provided adjacent the upper end of the upright element 26 to hold a spirit level. The spirit level may be removed and used elsewhere after the upright 26 has been arranged in vertical position.

Where necessary because of unusual trench width or other reasons, the grade board may be secured to a heavy wooden board of sufficient length to straddle the trench.

This may readily be done by disregarding the sliding extensions and simply attaching the base 25 to the wooden board by means of bolts. Provision for this is made by means of the openings 73 of base 25. Steel drift pins through holes 73 may also be used to pin the board to the ground.

The upright 26 of the grade board is a channel section provided with a vertical slot 80 in which the line set 37 and its clamping bolt 81 may ride. The line set 37 comprises a horizontal plate on top of which the grade line rests and which may also be used for sighting. Plate 37 is provided with an opening 84 through which the bolt 21 may pass and with a notch 83 to grip the end of the grade line.

The said bolt 81 passes through slot 80 and a threaded opening in clamp plate 87 on the other side of the slot 80. The wing nut 88 may then be used to tighten the head of bolt 81 against plate 37 to hold it against upright 26.

Plate 37 may have a slight projection 90 into the slot 80 to insure that the plate 37 will always be perpendicular to the slot 80.

The upright 26 may have ruled markings thereon to indicate the exact height of the line set plate 37 above the base of the grade board. This, however, is not essential since the grade transfer rod and a line level is used entirely for this purpose.

The arrangement of my novel grade board so that member 26 may extend below base 25 also provides for setting the grade line below the base 25 where required and also permits vertical adjustment of upright 26 where a bolt and nut are substituted for pivot pin 60.

The upright 26 may, of course, be simply pivoted at its bottom on pin 60 without being slidable with respect thereto, where the setting of the grade line below base 25 is not anticipated.

In Figures 2, 3, and 4, I have shown my precision grade transfer rod 33 which is a wooden or metal rod marked with a graduated rule scale 100, the smallest division of which should be $\tfrac{1}{16}$ of an inch.

The lower end of the grade transfer rod is provided with a reinforced shoe 101 which may be a metal collar adapted to rest accurately on the grade stake 20. The upper end of the rod 33 may also be reinforced by a metallic collar 102.

The upper end of the grade transfer rod 33 may also have a through opening 104 therein to receive a spirit level 105. The front of the grade transfer rod 33 is provided with a port or opening 107 through which the bubble in the spirit level 105 may be seen to insure that the grade transfer rod is exactly vertical.

An adjustable grade set 110 as shown in Figures 2, 3, and 4 is provided, which grade set is moved so that the line receiving portion 112 thereof is at the exact level above the bench mark at which the grade line 40 should run.

The grade set 110 as shown in Figure 4 is a rectangular collar which closely engages the sides of the rectangular grade transfer rod 33 and is provided with a clamping plate 115 recessed in one of the walls 116 thereof. The clamping plate has secured thereto a bolt 117 which projects through an opening 118 in wall 116.

A wing nut 120, held from lateral movement by wall collar 121', on the bolt 117 will push the clamping plate 115 into clamping engagement with the side of the rod 33 when turned in one direction and will release it when turned in the other direction.

The grade set 110 has an upward extension 121 which defines the notch 112 to grip the line 34 of Figure 1. Thus, when the additional elevation above the grade stake for the predetermined grade pole length is determined, 2′ 8″ in the foregoing example, the grade set 110 is moved up to a position where the notch 112 is at the 2′ 8″ mark above the grade stake 20.

The wing nut 120 is tightened, the end of the line 34 is placed in the notch 112 and the line 34 is stretched perfectly level by the use of the line level 35 to determining position for the top of the line set 37 on the upright 26 of the grade board 23 (Figures 1 and 5).

My novel precision excavating instruments also comprise precision grade pole accessories which may be used in connection with any standard rod, such as a wooden rod 1¼″ x 1¼″. The accessories comprise the grade pole shoe 125 of Figure 9 and the adjustable pole set 126 of Figure 10.

These elements are shown in position on the grade pole 30 of Figures 7 and 8. The grade pole shoe 125 is a metallic cup having four side walls 128, 129, 130, and 131, a bottom wall 132 and an open top 133.

The bottom wall 132 extends adjacent to side wall 131 to form the additional foot 135 which is braced by the brace member 136 extending between the additional foot 135 and the side wall 131.

Foot 135 may be introduced into the end of the pipe line as shown in Figure 1 to maintain the base of the grade pole 30 exactly at the center of the excavation and to make sure that the pipe line invert is being measured. The lower end of the pole 30 is introduced through opening 133 of the pole shoe 125 so that the bottom end of the pole rests on the bottom end 132.

Screws are then inserted through the screw holes 140 in side walls 130 and 128 to secure the pole shoe 125 to the lower end of the pole. The pole set 126 in Figure 10 is a rectangular tubular member having the walls 142, 143, 144, 145, which approximate the dimensions of the pole 30 and slide on the pole.

Clamping plate 150 is recessed in the recess 151 of the interior of wall 143 and is provided with a bolt 152 secured thereto and extending out through opening 153 in the wall 143. Wing nut 154 is mounted on the bolt 152.

The rotation of the wing nut 154 in one direction moves the clamping plate 150 in against the side of the pole. Rotation of the wing nut 152 in the opposite direction moves the clamping nut 150 away from the pole.

Thus, the pole set 126 may be moved upward or downward along the pole 30 to the proper position where the indicating surface 160 is at the exact height for a predetermined pole length.

A steel tape 161 may be provided, ruled off in feet and inches, and perforated at spaced intervals 162 as shown for attachment to the side of the pole.

Where, as in the examples pointed out, the grade line is established at 13 feet above the bottom of the trench making a 13 foot pole necessary, the pole set 126 is moved up to where the indicating surface 160 is at the 13 foot mark.

Where, owing to variations in the terrain, a 15 foot grade line is desired or a 10 foot grade line is desired, the pole set 126 is moved accordingly on the pole 30 to the proper setting.

An additional accessory consists of a metal cap 163 of Figure 12 to fit over the top end of the wooden grade pole thereby affording protection to the pole and preventing the loss of the pole set. This cap also has a hollow space 164 approximately the shape of the end of the pole and has two screw holes 165 for fastening to pole.

It may also be provided with clips 166 to hold a spirit level for use in determining when the pole is in a vertical position.

By the means herein disclosed, I have provided simplified precision instruments for determining the proper grade for pipe lines and other subsurface structures, the said instruments including a precision grade board, a precision grade transfer rod, and a precision grade pole, including the accessories therefor.

By this means, precision instruments are utilized to determine exactly the proper grade along which the pipe line should run and the variations and errors which flow from the use of crudely designed members are avoided.

In the foregoing, I have described my invention solely in connection with preferred illustrative embodiments thereof. Since many variations and modifications of my invention will now be obvious to those skilled in the art, I prefer to be bound not by the specific disclosures herein contained, but only by the appended claim.

I claim:

In combination, a plurality of adjustable precision grade boards each having a base and a vertical member arranged to form an inverted T with said base; said vertical member being pivotally connected to said base; said base being longitudinally extensible and measuring indicia on said vertical member and level determining means on said vertical member; means for locking said vertical member at a predetermined angle to said base, a line engaging element on said vertical member; said line engaging element being slidable vertically on said vertical member; and means for locking said line engaging element at a predetermined height, said grade boards being arrangeable with said bases parallel to each other and the line engaging element of each grade board at a uniform height above a reference level.

MORTON W. LIEBERMAN.

REFERENCES CITED

The following references are of record in the file of this patent:

UNITED STATES PATENTS

| Number | Name | Date |
| --- | --- | --- |
| 420,880 | Lambdin | Feb. 4, 1890 |
| 464,598 | Welton | Dec. 8, 1891 |
| 600,049 | Thompson | Mar. 1, 1898 |
| 854,916 | Stoner | May 28, 1907 |
| 862,280 | Pratt-Chadwick | Aug. 6, 1907 |
| 868,074 | Clark | Oct. 15, 1907 |
| 905,249 | Townsend | Dec. 1, 1908 |
| 907,329 | Fusco | Dec. 22, 1908 |
| 946,964 | Hall | Jan. 18, 1910 |
| 969,654 | Platt | Sept. 6, 1910 |
| 1,026,579 | Hauke | May 14, 1912 |
| 1,413,056 | Parrish | Apr. 18, 1922 |
| 1,742,595 | Hoevel | Jan. 7, 1930 |
| 1,783,507 | Kapps | Dec. 2, 1930 |
| 1,909,267 | Colt | May 16, 1933 |
| 1,976,264 | Miner | Oct. 9, 1934 |